HANS ERDMANN
FRIEDRICH BEUCHLE
A. BELLER
*INVENTOR.*

HANS ERDMANN
FRIEDRICH BEUCHLE
A. BELLER
INVENTOR.

United States Patent Office 3,499,509
Patented Mar. 10, 1970

3,499,509
DISK BRAKE CALIPER MOUNTING AND
ADJUSTING MEANS
Hans Erdmann, Gravenbruch, Friedrich Beuchle, Frankfurt am Main, and Albert Beller, Bad Vilbel, Germany, assignors to Alfred Teves GmbH, Frankfurt am Main, Germany, a corporation of Germany
Filed July 9, 1968, Ser. No. 743,454
Claims priority, application Germany, Mar. 13, 1968, T 36,055
Int. Cl. F16d 55/228
U.S. Cl. 188—73
9 Claims

ABSTRACT OF THE DISCLOSURE

A disk brake whose yoke or caliper is swingably mounted upon a support connected to the axle housing of the vehicle via a pair of axially aligned pivot balls resiliently held against spherically segmental seats by elastically stressed screws. The screws have cup-shaped open ends engaging the balls.

---

Our present invention relates to spot-type disk brakes and, more particularly, to segmental disk brakes whose yokes receive the brake disk along only a limited portion of the periphery of the disk and are movable with respect to the latter to uniformly apply the brakeshoes or pads thereagainst.

It has already been proposed to provide swingable or pendular yokes or calipers in disk-brake systems for automotive vehicles, the yoke or caliper having a pair of yoke halves or lobes flanking the respective annular braking faces of a disk connected to the wheel or axle of the vehicle, at least one of these lobes being provided with actuating means for applying a respective brakeshoe or pad against a segment of the respective braking surface. The actuating means may be hydraulic (e.g. a piston-and-cylinder arrangement energized with brake fluid from a master cylinder operated by the brake pedal of the vehicle) or mechanical (e.g. provided with a lever linkage coupled by a bowden cable to an actuating lever in the region of the driver seat of the vehicle). The other brakeshoe or pad is applied against the opposite annular braking face of the disk at least in part by reaction force transferred to this second brakeshoe by the movable yoke. In addition, a further wheel-brake cylinder and hydraulically displaceable piston may be provided in the second lobe of the yoke for displacement of its brakeshoe or pad jointly with the first brakeshoe or via a second brake-fluid network. As previously indicated, the yoke or caliper is generally of a U-shaped or C-shaped configuration, one shank of which is mounted upon the axle housing with some degree of mobility to allow reaction forces to displace the yoke at least limitedly and ensure uniform wear of the brake linings on the opposite sides of the disk. One method of permitting such mobility is to pivot the supported lobe of the yoke or caliper, referred to generally as the flange side of the yoke while the unsupported or cantilevered lobe is termed the wheel side since it is generally enveloped in the tire-carrying wheel disk. The pivotal axis provided by such mounting means lies generally parallel to the braking faces of the disk and perpendicular to the axis of rotation of the brake disk and the axis of the wheel-brake cylinders which are generally aligned and are themselves parallel to the axis of rotation of the disk in an uncanted position of the yoke or caliper.

When conventional pivot arrangements are used to allow the yoke or caliper to swing about an axis parallel to the disk and in an axial plane of both the brake disks and the wheel-brake cylinders, it has been found that chattering occurs when pivoting movement is insufficiently constrained and as a result of undesired contact of portions of the brakeshoe with the rotating disk in an unactuated condition of the brake. When, however, pivoting movement is constrained and must be overcome by the hydraulic pressure developed at actuation of the brake, it is often found that the brake linings do not return to their rest positions and remain in contact with the disk after hydraulic pressure is released. Consequently, wear of one of the brake linings may continue after release of the brake, a circumstance giving rise to nonuniformity of wear between the two linings.

It is the principal object of the present invention to provide an improved mounting system for pivotal-yoke spot-type disk brakes of the character described.

We have found that the aforedescribed disadvantages can be obviated and a highly effective mounting arrangement can be provided for the yoke or caliper of a disk brake when the mounting means comprises a support (generally connected with the axle housing or some other nonrotatable portion of the vehicle body) which is received between the arms of a bifurcated support flange of the yoke and is formed with a pair of outwardly open annular spherically segmental ball seats; the pivot members are balls resiliently held (clamped frictionally) against these seats by a pair of screws or pintel studs threaded into the respective arms.

The screws are formed with generally spherical seats conforming to the surface of the ball engaged thereby and are preferably constituted as cup-shaped members open in the direction of the respective ball and provided with an axially extending bore which, at the mouth of the screw, widens into a spherically segmental seat engageable with the ball. The ball, the support seat therefor and the retaining screw of each of the two assemblies of the pivot frictionally engage under the resilient axial force of the screw, thereby forming a combined torsion spring and friction clutch which is effective when brake fluid is supplied under pressure to the wheel-brake cylinder, to allow the brake yoke to pivot upon any increase in brake play which can be attributed to increase wear of the brake lining. The assembly acts as a torque spring which returns the yoke in the opposite sense upon release of the brake to restore the original brake play. It is only when this resilient restorative movement is exceeded that slippage occurs between either the screw or the support seat and the ball to accommodate the self-adjusting operation mentioned earlier.

We have found, further, that the screw may serve to compensate for thermal expansion and contraction of the system and to retain the ball under resilient pressure if the seat formed in the screw has a radius of curvature which is less than that of the ball so that, when the screw is driven home, it expands slightly outwardly and thereby accommodates both thermal stress and other mechanically derived stresses with the elasticity provided by such expansion.

According to a further feature of this invention, a sealing ring surrounds the ball and is locked between the screw and the support member to prevent moisture and contaminants from reaching the ball or the seats.

The above and other objects, features and advantages of the present invention will become more readily apparent from the following description, reference being made to the accompanying drawing in which.

Figure 3:
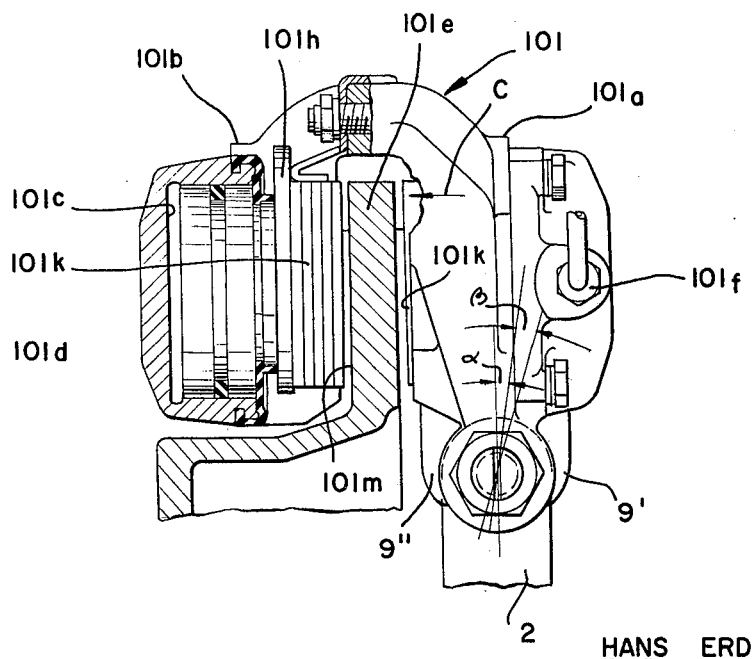
FIG. 3 is an end view of the mounting assembly showing its use on a disk-brake caliper.

When reference is made hereinafter to a disk-brake yoke, it will be understood that in the general case the mounting assembly is provided upon the flange lobe of the yoke or caliper which is also formed with the actuating means while the other lobe of the yoke merely carries a brakeshoe without a wheel-brake cylinder so that, upon hydraulic actuation of the single wheel-brake cylinder, the pivotal movement of the yoke by reaction force draws the other brakeshoe (which cannot be displaced relatively to the yoke) against the disk. However, as shown in FIG. 3, the system may be used with substantially any wheel-brake cylinder arrangement.

Figure 1:
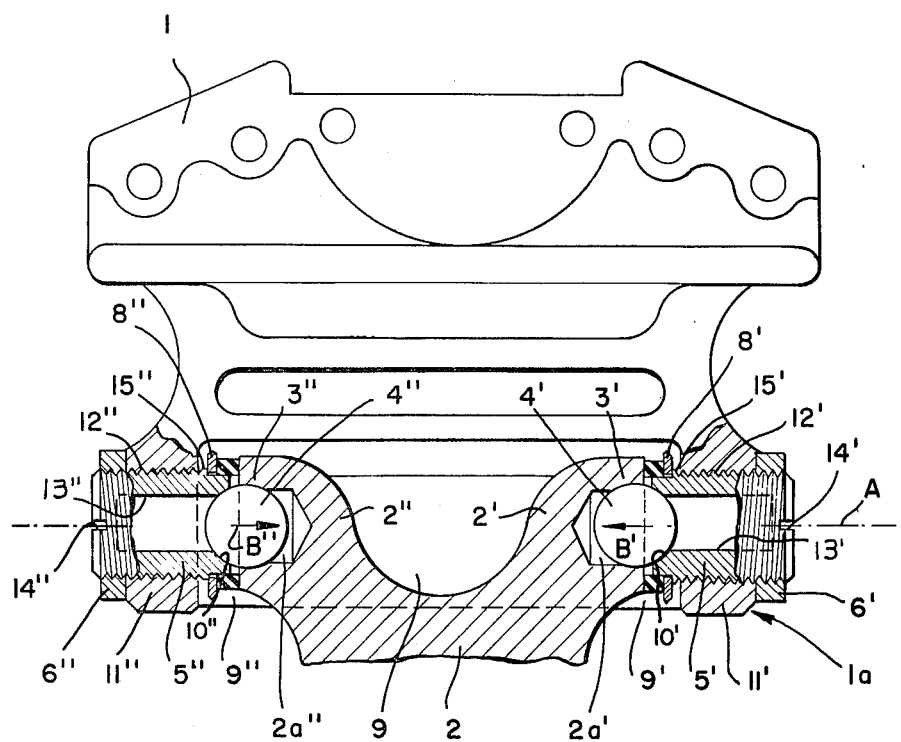
FIG. 1 is a side-elevational view of the pivotally supported lobe of a brake yoke embodying the present invention.
Figure 2:
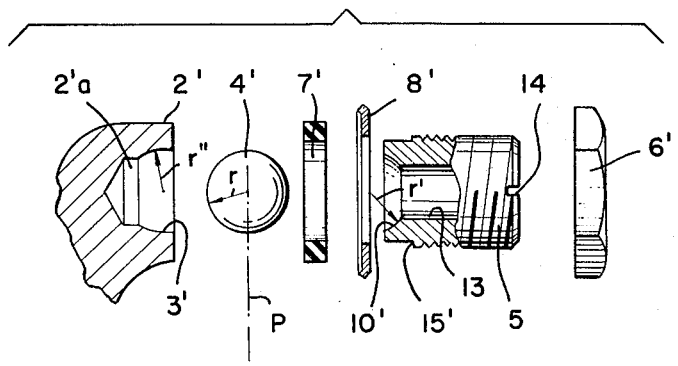
FIG. 2 is an exploded view of the mounting assembly, partially in section.

Referring now to FIGS. 1 and 2, it can be seen that the brake yoke 1, only one lobe of which is illustrated in FIG. 1, can be provided with a bifurcated flange 1a which is pivotally mounted upon the brake support 2. The later may form part of the axle housing and is provided with a pair of outwardly extending lugs 2' and 2", each of which is formed with an outwardly open bore 2a' or 2a", the mouth of which widens outwardly to form an annular spherical-segmental seat 3' or 3". The upstanding support member 2 is received within a downwardly open compartment 9 formed between a pair of spaced-apart ribs 9' and 9" (see also FIG. 3) flanking the support 2 and terminating at a pair of arms 11' and 11". The later are formed with threaded bolts 12' and 12" axially alignable with the bores 2a' and 2a", respectively, the common axis A lying parallel to the braking faces of the disk and perpendicular to the axis of rotation thereof. The ribs 9' and 9" reinforce the arms 11' and 11" of the yoke 1.

A pair of balls 4' and 4" are received in the seats 3' and 3'" having a radius of curvature r" (FIG. 2) substantially equal to the radius r of the respective ball As shown in FIGS. 1 and 2, the support lugs 2' and 2" may extend somewhat beyond the equatorial plane P of the ball perpendicular to the axis A when the ball is received in their seats.

The balls 4' and 4" are resiliently held in place (arrows B', B") by a pair of setscrews 5' and 5" threaded into the bores 12' and 12" respectively. The setscrews are of cupshaped configuration, with blind axial bores 13' and 13", open in the direction of the balls 4' and 4" and widen at the mouths thereof into spherical-segemntal seats 10' and 10". As shown in FIG. 2, the seats 10' and 10" have a radius of curvature r' which is slightly less than the redius r of the ball so that, when the screws are driven home, a radial extension of the respective seats resiliently retains the balls and permits thermal expansion and contraction and elastic yielding to stress. The screws 5' and 5" are slotted at 14', 14" to accommodate the usual screwdriver and can be locked in place by nuts 6' and 6" in the conventional manner. The threaded shanks of the screws 5' and 5" terminate at shoulders 15', 15" against which respective washers 8' and 8" abut, these washers clamping rubber-sealing rings 7' and 7" against the annular surfaces 2b' and 2b" surrounding the seats 3' and 3". The structure is shown in an exploded view in FIG. 2.

In FIG. 3, we have illustrated a disk brake in which the yoke 101 has a pair of lobes 101a and 101b, each of which is formed with a wheel-brake cylinder 101c whose piston 101d can be urged toward the disk 101e upon the delivery of brake fluid to the cylinder, e.g. via the fitting 101f. Each piston bears upon the backing plate 101h of a brakeshoe whose lining 101k is engageable with the respective braking face 101m of the disk. The mounting assembly is identical to that described in connection with FIGS. 1 and 2. Assuming, therefore, that the wheel-brake cylinder at the left-hand side of FIG. 3 is inoperative (a condition identical to that obtaining when this cylinder is omitted), it will be seen that application of brake pressure to the wheel-brake cylinder at the right-hand side of the yoke will drive its brakeshoe against the disk 101e (arrow C), the reaction force swinging the yoke in the clockwise sense about the pivot axis A to bring the other brakeshoe into engagement with the disk. The swinging movement is represented by the angle α and corresponds to normal brake play. When hydraulic pressure is released, the resilient torque action of the screws 5', 5" and the balls 4', 4" returns the yoke counterclockwise to the angle α, thereby preventing continuous contact of the brakeshoe with the disk. When the brakeshoe wears, however, hydraulic pressurization swings the yoke 101 in the clockwise sense through the angle β proportional to the degree in brake wear, as a result of slippage between the screws and the balls and/or between the balls and their seats 3', 3". Such slippage occurs without release of the restoring torque so that, once brake pressure is released, the fluid is returned through the angle α to re-establish the brake play and, therefore, create a new rest position for the yoke. The angles α and β have been exaggerated in FIG. 3 for the purpose of clarity. It thus appears that, when a cup-shaped screw axially bears frictionally against a ball as described, there is a slight resilient yieldability in the screw or the seat against which the ball is held sufficiently to take up the brake play and restore the yoke upon release of the brake.

It will be understood that the clamping of the balls 4' and 4" against the seats 3' and 3" by the screw s5' and 5" also causes these screws to flare outwardly slightly, thereby locking the screws of the threaded bores 12' and 12."

When the disk brake is of the type using a pair of wheel-brake cylinders, similar adjustment of the yoke occurs to compensate wear of the brakeshoes although the swinging movement of the yoke may take place in either sense.

We claim:

1. In a spot-type disk brake having a yoke pivotally mounted upon a nonrotatable support disposed adjacent a rotatable brake disk and reaching around the periphery of said disk while having a pair of brakeshoes engageable therewith, mounting means for swingably supporting said yoke upon said support, and actuating means for displacing at least one of said brakeshoes against said disk, the improvement wherein said mounting means includes:

a pair of oppositely facing axially aligned first ball seats formed on said support along an axis parallel to said disk and constituting the pivotal axis of said yoke, said yoke being formed with a pair of parallel arms provided with respective threaded bores aligned along said axis, said support being received between said arms and said first seats each being open in the direction of one of said arms;

a respective ball respectively received in each of said seats; and a respective cup-shaped screw open in the direction of the respective ball and threadedly received in each of said bores while being formed with a respective second seat concave in the direction of and engaging the respective ball while bearing resiliently thereagainst whereby pivotal movement of said yoke within a predetermined brake play generates a restoring torque between said screws, said balls and said first seats while pivotal movement beyond said predetermined play permits relative displacement of said yoke about said axis.

2. The improvement defined in claim 1 wherein each of said screws has a blind bore open in the direction of the respective balls and formed at its mouth with the respective second seat, each of said second seats constituting a spherical segment.

3. The improvement defined in claim 2 further comprising a respective resilient sealing ring clamped between each of said screws and said support and surrounding said balls and said seats for excluding contaminants therefrom.

4. In a spot-type disk brake having a yoke pivotally mounted upon a nonrotatable support disposed adjacent a rotatable brake disk and reaching around the periphery of said disk while having a pair of brakeshoes engageable therewith, mounting means for swingably supporting said yoke upon said support, and actuating means for displacing at least one of said brakeshoes against said disk, the improvement wherein said mounting means includes:

a pair of oppositely facing axially aligned first ball seats formed on said support along an axis parallel to said disk and constituting the pivotal axis of said yoke, said yoke being formed with a pair of parallel arms provided with respective threaded bores aligned along said axis, said support being received between said arms and said first seats each being open in the direction of one of said arms;

a respective ball respectively received in each of said seats;

a respective cup-shaped screw open in the direction of the respective ball and threadedly received in each of said bores while being formed with a respective second seat concave in the direction of and engaging the respective ball while bearing resiliently thereagainst whereby pivotal movement of said yoke within a predetermined brake play generates a restoring torque between said screws, said balls and said first seats while pivotal movement beyond said predetermined play permits relative displacement of said yoke about said axis, each of said screws having a blind bore open in the direction of the respective balls and formed at its mouth with the respective second seat, each of said second seats constituting a spherical segment;

a respective resilient sealing ring clamped between each of said screws and said support and surrounding said balls and said seats for excluding contaminants therefrom; and a respective washer on each of said screws and axially entrained therewith for maintaining the respective sealing ring against said support.

5. The improvement defined in claim 4 wherein each of said second seats has a radius of curvature less than that of the respective ball in a condition of the screw out of engagement with the ball.

6. The improvement defined in claim 4 further comprising a respective locking nut threaded onto the respective screw and retaining same in the respective arm.

7. The improvement defined in claim 6 further comprising a pair of ribs extending parallel to said axis and connecting said arms while flanking said support.

8. The improvement defined in claim 7 wherein each of said first seats extends beyond the equatorial plane of the respective ball perpendicular to said axis.

9. The improvement defined in claim 8 wherein said mouths of said screws lie inwardly of the respective arms.

References Cited

UNITED STATES PATENTS

| 2,533,186 | 12/1950 | Bricker et al. | 188—73 |
| 2,983,337 | 5/1961 | Butler | 188—73 |

FOREIGN PATENTS

| 1,484,078 | 5/1967 | France. |
| 1,008,826 | 11/1965 | Great Britain. |

GEORGE E. A. HALVOSA, Primary Examiner

U.S. Cl. X.R.

188—196